Oct. 18, 1955  W. E. K. MIDDLETON  2,720,812
INSTRUMENT FOR MEASURING DISTINCTNESS OF IMAGE GLOSS
Filed Sept. 30, 1952  3 Sheets-Sheet 1

Inventor
WILLIAM EDGAR KNOWLES MIDDLETON
By Bailey, Stephens & Huettig
Attorneys Oct. 18, 1955   W. E. K. MIDDLETON   2,720,812
INSTRUMENT FOR MEASURING DISTINCTNESS OF IMAGE GLOSS
Filed Sept. 30, 1952   3 Sheets-Sheet 2
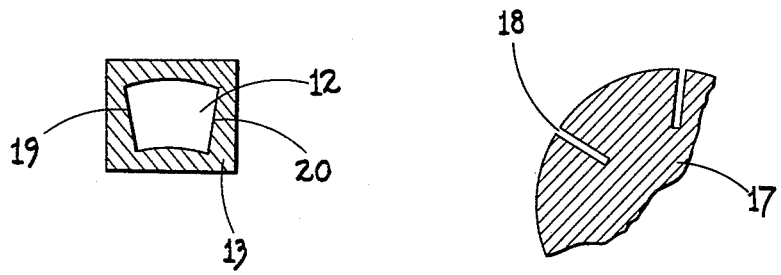
FIG. 2.   FIG. 3.
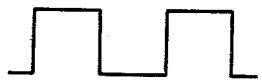   
FIG. 4(a).   FIG. 4(b).
FIG. 4(c).
Inventor
WILLIAM EDGAR KNOWLES MIDDLETON
By Bailey, Stephens & Huettig
Attorneys

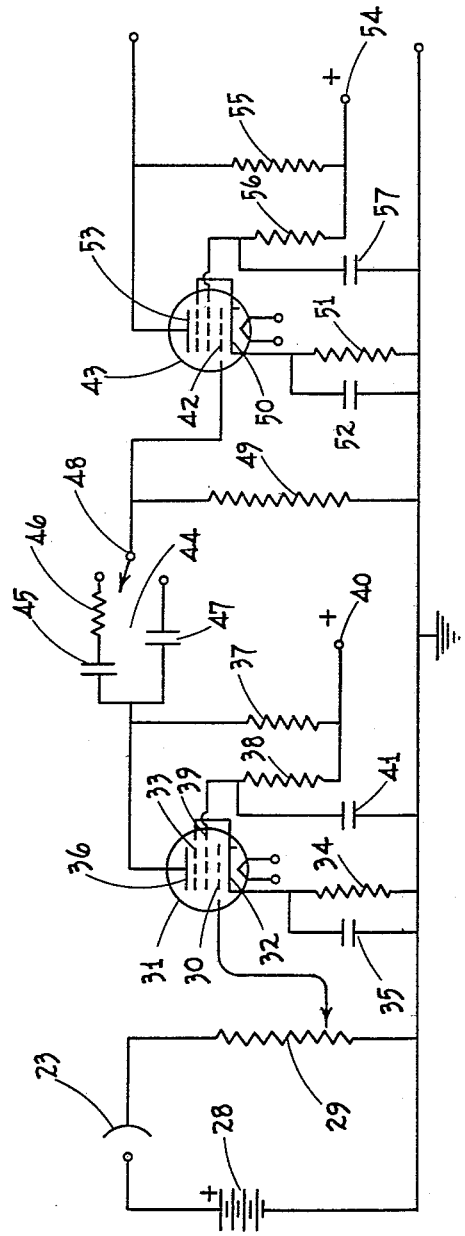

United States Patent Office 2,720,812
Patented Oct. 18, 1955

2,720,812

INSTRUMENT FOR MEASURING DISTINCTNESS OF IMAGE GLOSS

William Edgar Knowles Middleton, Ottawa, Ontario, Canada

Application September 30, 1952, Serial No. 312,379

7 Claims. (Cl. 88—14)

This invention is concerned with an apparatus for measuring gloss and more particularly with an apparatus for measuring distinctness of image gloss.

The different types which are important for commercial purposes have been classified as specular gloss, sheen, contrast gloss, absence-of-bloom gloss, distinctness-of-reflected-image gloss and absence-of-surface-texture gloss. Distinctness-of-reflected-image gloss is of considerable importance in the determination of the surface qualities of high gloss finishes, enamels, lacquers and other smooth image-reflecting surfaces. In high gloss reflective surfaces differences in specular gloss are less apparent than differences in the distinctness of images reflected by such surfaces. Consequently distinctness-of-image gloss is the accepted method of comparing the properties of such surfaces.

The conventional method of determining distinctness of image gloss is to compare the images of a window sash reflected by two or more surfaces. This method of estimation is subject to a number of disadvantages. A skilled observer is necessary. Different observers or even the same observer on different days may arrange the same set of samples in a different order, test conditions are not reproducible and may vary with the locality and the light conditions at the time of the test. Also accurate determination of the distinctness-of-image gloss in this manner requires standard samples with properties comparable to the specimen being tested. It is difficult to provide standard samples which will not fade or suffer other alterations in their properties over a period of time. A further difficulty is that it is exceedingly difficult to make an accurate visual comparison of the distinctness of reflected image gloss of a black and a white surface or of two surfaces differing in colour.

It is apparent that a successful comparator must give a comparison or quantitative determination which is closely in accordance with the visual determinations of skilled observers. No satisfactory photometric method of achieving this has been previously developed.

The main qualities of a surface which affect distinctness-of-image gloss are diffuse reflection of a specimen which tends to destroy the contrast between highlight and shadow and the smoothness of its surface, lack of which causes a distortion of the reflected image. An apparatus in accordance with this invention involves a determination of the slope of the distribution curve of light reflected adjacent to the region of specular reflection. If the slope of the distribution curve of diffusely reflected light adjacent to a specularly reflected image is steep, the image will be well defined. A more gradual slope will result in an image which is indistinct, due to lack of contrast between highlight and shadow. Practical tests of an apparatus based on this principle have shown that there is a close correlation between the results given by the apparatus and visual determination in the conventional manner. If the surface lacks smoothness a blurring of the definition of the image will result, as light will be reflected by uneven portions of the sample at an angle to the light specularly reflected by even portions of the sample. The present apparatus will be responsive to blurring caused by lack of smoothness. However, a plane sample should be used. Serious distortion, such as by curvature of the sample, may give inaccurate results.

In accordance with the method of this invention regarded in its broadest aspect, the slope of the distribution curve of the light flux reflected adjacent to the position of specular reflection of an image from a plane sample is quantitatively determined. The apparatus used in accordance with this invention includes a shielding member having an illuminated opening, preferably sector shaped, and moving scanning means with spaced slits, preferably a rotating scanning disc with radial slits; a lens or other suitable means directs an image of the opening reflected from the sample onto the scanning means, so that at one position of each of the slits it coincides with the image of one of opposite sides of the opening, and at another position coincides with the other side of the opening. The spacing between the slits is greater than the spacing between the opposite sides of the opening to give a fluctuating light flux passing through the slits. The slope of the distribution curve of this light flux is measured to give a quantitative determination of distinctness of image gloss.

In the drawings which illustrate the preferred embodiment of this invention,

Figure 2 is a detail elevation view of the diaphragm.

Figure 3 is a detail elevation view of a portion of the scanning disc.

Figure 4a illustrates the wave form of the output of the photoelectric means with a perfectly reflecting surface.

Figure 4b illustrates the wave form as in Figure 4a with a surface which gives diffuse and distorted reflection.

Figure 4c shows the wave form of the differentiating circuit output with a surface as in Figure 4b.

Figure 5 is the circuit diagram of a suitable differentiating circuit.

Figure 1:
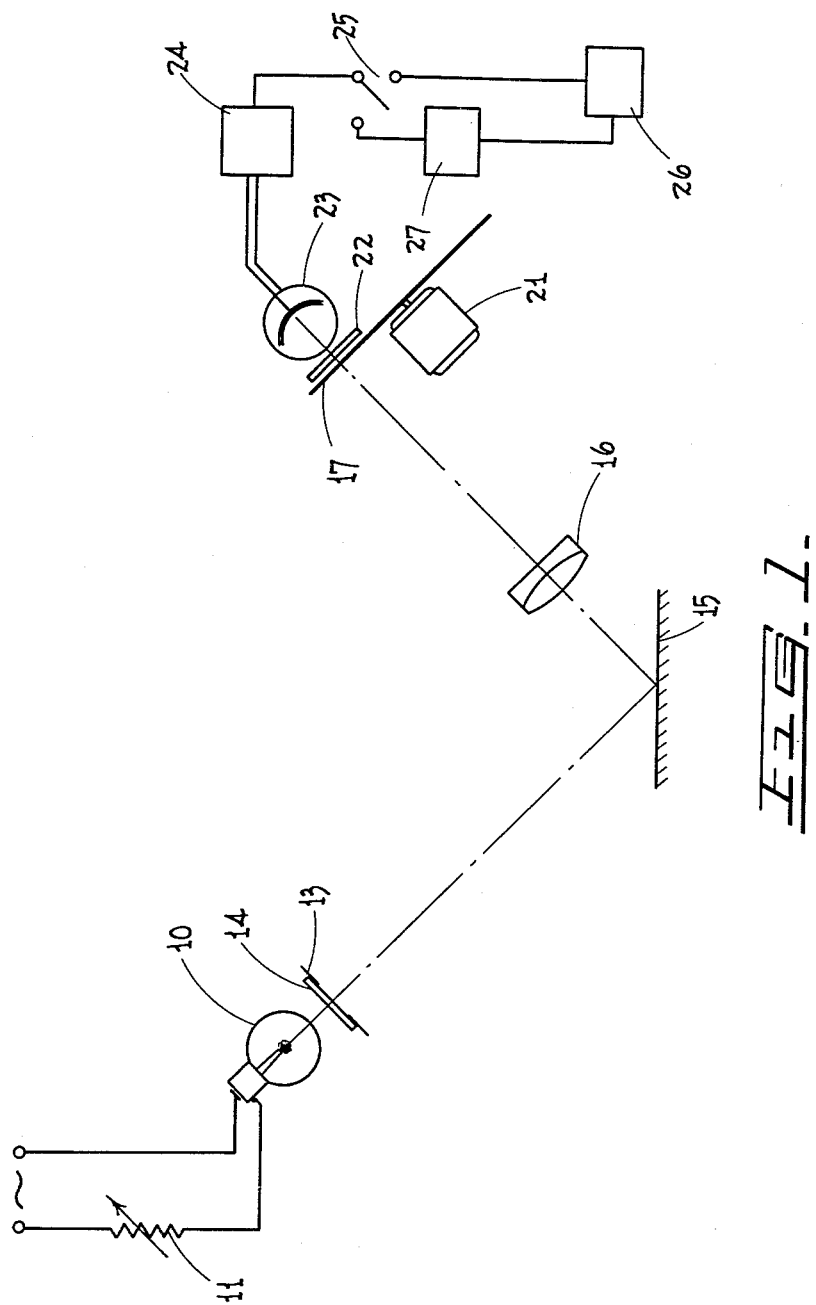
Figure 1 is a plan view diagrammatically illustrating the apparatus.

The apparatus illustrated in the drawings includes a source of light 10 controlled by a variable resistance 11 and illuminating a sector shaped opening 12 in a diaphragm 13. Diaphragm 13 is shown in detail in Figure 2. A diffusing glass 14 can be inserted in contact with diaphragm 13 between diaphragm 13 and source 10. Alternatively, the diffusing glass can be replaced by a short focus lens with the lamp filament at its focal point. The foregoing arrangement causes a beam of light to be directed onto sample 15 which is angularly disposed with respect to the axis of the beam. A lens 16 directs an image of opening 12 reflected from sample 15 onto the surface of scanning disc 17. Disc 17, shown in detail in Figure 3, is a circular disc penetrated by equally spaced radial slits 18. The angular spacing between the slits must be greater than the angle between the inclined sides 19 and 20 of the sector shaped opening so that as the disc rotates a fluctuating light flux will pass through the slits. The apparatus is disposed so that the inclined sides of the image of slot 12 projected upon the surface of disc 17 will be radial with respect to the disc and thus will each coincide with each of the slits at one position of rotation of the disc. A constant speed motor 21 rotates scanning disc 17.

An opal glass 22 is disposed immediately behind the scanning disc and behind glass 22 is a phototube 23 to detect the fluctuating light flux of light reflected from the sample and passing through the slits.

The rate of change of the phototube output is analyzed by an electronic circuit which provides a quantitative determination of the rate of change of the output. This provides a measurement of the slope of the distribution curve of light reflected from the sample adjacent to the region of specular reflection.

The electronic circuit is shown in outline in Figure 1. The output from phototube 23 goes to a wide band voltage amplifier 24 after which the amplified voltage can follow either of two paths depending on the position of switch 25. In one position of switch 25 it is passed direct to a suitable peak voltmeter 26. In the other position it is passed through a differentiating circuit 27 before being measured by voltmeter 26.

The apparatus may be used to measure distinctness of image gloss in the following manner. Switch 25 is adjusted for direct connection to voltmeter 26. Then by adjusting rheostat 11, or in any other suitable manner, the brightness of source 10 is varied until voltmeter 26 indicates a standard pre-arranged value. Switch 25 is then turned to include differentitating circuit 27 in the circuit. If sample 15 were a perfectly plane mirror the output of amplifier 24 would be in a square wave form as shown in Figure 4a. However, with a sample which gives some diffuse reflection the wave will have sloping sides as shown in Figure 4b. The differentiating circuit 27 will provide an output which is in a peaked wave form as shown in Figure 4c, the height of the peaks depending on the maximum slope of the sides of the wave forms which are the output of amplifier 24. Voltmeter 26 gives a measurement of the height of these peaks and thus provides a quantitative determination of the distinctness of image gloss of the sample.

In the case of samples similar except as to distinctness of image gloss the first operation of connecting the output of amplifier 24 direct to voltmeter 26 could be omitted during measurements subsequent to the first. It would therefore be possible to use peak voltmeter 26 to operate a mechanism to sort objects according to their gloss or to reject those which did not meet pre-arranged specifications in this regard.

A suitable amplifying and differentiating circuit is shown in Figure 5. It will be seen from Figure 5 that a linear photo-electric cell 23, in series with a battery 28, and a potentiometer 29, constitute the input circuit.

The voltage developed across the potentiometer 29 is applied to the control grid 30 of pentode 31. The cathode 32 and the suppressor grid 33 of pentode 29 are connected to ground through cathode bias resistance 34 and cathode bias resistance by-pass capacitance 35. The anode voltage of pentode 31 is supplied to the anode 36 through resistance 37 from anode voltage supply. The screen grid 39 of pentode 29 is connected to anode voltage supply 40 through resistance 38 and is connected to ground through decoupling capacitance 41.

The voltage developed across resistance 37 is applied to the control grid 42 of pentode 43 through resistance capacitance coupling 44. This coupling can be varied to give two orders of input to the control grid 42 of pentode 43, i. e. via a combination of capacitance 45, a resistance 46, or via capacitance 47, the selection being achieved by a single pole double throw switch 48.

The control grid 42 of pentode 43 is connected to ground through grid resistance 49. The cathode 50 and the suppressor grid of pentode 43 are connected to ground through cathode bias resistance 51 and cathode bias resistance by-pass capacitance 52. The anode voltage of pentode 43 is applied to anode 53 through anode load resistance 55 from anode voltage supply source 54 which is also connected to the screen grid of pentode 43 through screen voltage dropping resistance 56 and decoupling capacitance 57.

The voltage developed across resistance 55 by the anode current of pentode 43 is applied to a vacuum tube voltmeter 26. Thus the maximum slope of the distribution curve of the fluctuating light flux detected by the photo-electric cell 23, amplified by pentodes 31 and 43, is shown as a numerical on vacuum tube voltmeter 26.

It will be apparent from the foregoing that an apparatus and method in accordance with this invention will afford a simple, convenient, accurate and readily reproducible means for determining distinctness of image gloss.

I claim:

1. An apparatus for measuring the distinctness of image gloss of a plane sample comprising a diaphragm having a sector shaped opening, a source of light disposed to direct a beam of light through said opening onto a sample, a rotating scanning disc having radial slits spaced apart at an angle greater than the angle between the converging sides of the opening, means to direct an image of said opening reflected from the sample onto the scanning disc, the scanning disc being disposed so that the image of the converging sides of the opening will be radial with respect to the scanning disc, photo-electric means for detecting the fluctuating light flux passing through the slits in the scanning disc and means for quantitatively measuring the alteration in the manner of fluctuation caused by diffusion of the image projected onto the scanning disc.

2. An apparatus for measuring the distinctness of image gloss of a plane sample comprising a diaphragm having an illuminated sector shaped opening, a rotating scanning disc having radial slits spaced apart at an angle greater than the angle between the converging sides of the opening, a lens for focussing an image of said opening reflected from the sample onto the scanning disc with the inclined sides of the image of the opening radial with respect to the disc, photo-electric means for detecting the fluctuating light flux passing through the slits in the scanning disc and means for determining the slope of the wave form of the output of said photo-electric means.

3. An apparatus for measuring the distinctness of image gloss of a plane sample comprising a diaphragm having an illuminated sector shaped opening, a rotating scanning disc having radial slits spaced apart at an angle greater than the angle between the converging sides of the opening, a lens for focussing an image of said opening reflected from the sample onto the scanning disc with the inclined sides of the image of the opening radial with respect to the disc, photo-electric means having its output connected with a differentiating circuit to give a measurement of the slope of the distribution curve of light flux reflected to points adjacent to the inclined sides of the image of the sector shaped opening.

4. An apparatus as in claim 3 in which adjacent slits are disposed at an angle twice the angle between the inclined sides of the sector shaped opening.

5. An apparatus for measuring the distinctness of image gloss of a plane sample comprising a diaphragm having an illuminated sector shaped opening, a rotating scanning disc having radial slits spaced apart at an angle greater than the angle between the converging sides of the opening, a lens for focussing an image of said opening reflected from the sample onto the scanning disc with the inclined sides of the image of the opening radial with respect to the disc, photo-electric means for detecting the fluctuating light flux passing through the slits in the scanning disc, means for electrically connecting the output of the photo-electric means to a peak voltmeter, a differentiating circuit and means for inserting the differentiating circuit into the circuit between the photo-electric means and the peak voltmeter, said differentiating circuit to be adapted to give a quantitative reading on the voltmeter representing the maximum rate of change of said fluctuating light flux.

6. An apparatus as in claim 5 in which said photo-electric means includes a phototube, and a wide band voltage amplifier electrically connected therewith.

7. An apparatus for measuring the distinctness of image gloss of a plane sample comprising a shielding member having an illuminated opening therein, moving scanning means, means for focussing an image of said opening reflected from a sample onto said scanning means, slits in said scanning means each of which moves through positions in which the slit coincides with the image of each of opposite sides of said opening, said slits being spaced apart a greater distance than the distance between said opposite sides of the image of the opening, photo-electric means for receiving the fluctuating light flux passing through said slits, and differentiating means acting on the output of said photo-electric means adapted to provide a measurement of the slope of the distribution curve of light flux reflected to points adjacent to said opposite sides of the image of the opening.

References Cited in the file of this patent

UNITED STATES PATENTS

| | | |
|---|---|---|
| 2,287,322 | Nelson | June 23, 1942 |
| 2,578,625 | Bowers et al. | Dec. 11, 1951 |

FOREIGN PATENTS

| | | |
|---|---|---|
| 972,624 | France | Aug. 30, 1950 |
| 642,456 | Great Britain | Sept. 6, 1950 |